Patented Dec. 23, 1941

2,267,293

UNITED STATES PATENT OFFICE 2,267,293

RECOVERY OF HYDROCYANIC ACID

Robert N. Washburne, Philadelphia, and Le Roy U. Spence, Elkins Park, Pa., assignors to Röhm & Haas Company, Philadelphia, Pa.

No Drawing. Application January 12, 1940, Serial No. 313,558

5 Claims. (Cl. 23—151)

This invention relates to an improvement in the process of recovering hydrocyanic acid from coke oven gases. It relates more particularly to the recovery of hydrocyanic acid from the precipitate obtained by treating the final cooler water from coke oven plants with a soluble zinc salt and an alkali to precipitate the hydrocyanic acid in the form of zinc cyanide.

The gases from coke oven plants usually contain hydrogen cyanide, hydrogen sulfide, and carbon dioxide. These are all absorbed more or less completely in the final cooler water and when this water is treated with a soluble zinc salt and an alkali such as lime to recover the hydrogen cyanide, the precipitate which forms contains zinc cyanide, zinc sulfide, zinc hydroxide, zinc carbonate, calcium carbonate, and any excess calcium hydroxide. When this precipitate or sludge is treated with an acid, hydrogen cyanide, hydrogen sulfide, and carbon dioxide are liberated. The great difficulty in the past has been to obtain the hydrogen cyanide free of hydrogen sulfide. Several processes have been proposed to separate these two gases. In U. S. Patent 2,143,821 it is proposed to aerate the final cooler water with a relatively small volume of air to expel the hydrogen sulfide and then at a higher temperature with a larger volume of air to expel the hydrogen cyanide. In U. S. Patent 2,088,003 it is proposed to treat the sludge with an acid which evolves the hydrogen cyanide and the hydrogen sulfide and then remove the hydrogen sulfide by fractional distillation or by scrubbing the mixture with a slurry of zinc cyanide or by a combination of these procedures.

It has now been found that the hydrogen cyanide can be recovered in a very pure state directly from the zinc cyanide sludge without the necessity of separating it from the hydrogen sulfide by methods such as those described in Patent 2,088,003. This is accomplished by treating the sludge with an acid under controlled conditions such that substantially all the hydrogen cyanide but practically none of the hydrogen sulfide is evolved. The novel feature of the invention is treating the sludge with an amount of acid which is sufficient to liberate all the hydrogen cyanide and carbon dioxide but which is insufficient to establish in the solution with which the slurry is finally in contact, a concentration of acid great enough to liberate any hydrogen sulfide. The hydrogen cyanide and a considerable portion of the carbon dioxide which are liberated remain dissolved in the water and the former can be recovered from this solution by distillation. The hydrogen cyanide thus obtained is very pure containing less than 0.02% of hydrogen sulfide.

There are two modifications of the process by which the hydrogen cyanide may be thus recovered, both of which depend on keeping the concentration of acid in the solution with which the sludge is finally in contact, below the concentration at which it will liberate hydrogen sulfide from the zinc sulfide at the temperature employed. According to one modification the sludge or slurry containing about 10% of solids equivalent to about 3% of HCN is treated with about 10% more acid than is required to liberate all the hydrogen cyanide and all the carbon dioxide. This treatment is carried out at low temperatures, below about 35° C. The insoluble residue, consisting chiefly of zinc sulfide and calcium sulfate is then separated from the solution by filtration, sedimentation or other convenient means. The clear solution thus obtained is then heated to about 60° C. to expel most of the carbon dioxide after which the hydrogen cyanide is separated from the water by fractional distillation. A small amount of hydrogen cyanide is evolved with the carbon dioxide and may be recovered by any convenient means or the mixed gases can be returned to the final cooler where the hydrogen cyanide will be reabsorbed. The filter cake may then be treated with more acid to recover the zinc values and any residual traces of hydrogen cyanide.

According to a second modification the amount of acid added is not greater than the equivalent of the hydrocyanic acid and all of the basic material present and hence is not greater than the amount required to liberate all the hydrocyanic acid and all of the carbon dioxide. The zinc sulfide being less readily attacked than the calcium carbonate or zinc carbonate remains unaffected even when the resulting mixture is heated to expel the carbon dioxide and the hydrogen cyanide. Thus hydrogen cyanide free of all but a very faint trace of hydrogen sulfide may be obtained by distilling the mixture without the necessity of previously separating the solution from any residual solid material. In this modification also the mixture can be heated to about 60° C. prior to distillation for the purpose of expelling most of the carbon dioxide. Any hydrogen cyanide which escapes at this time may be recovered by any convenient method or the gas mixture may be returned to the final cooler where the hydrogen cyanide will be reabsorbed. The residue from the distillation can then be treated with more acid to recover the zinc values.

The following examples will serve to illustrate the invention. The zinc cyanide sludge employed was obtained from the final cooler water of a coke plant by treating the water with zinc sulfate and lime. The sludge obtained was filtered and dried. The dry powder was well mixed so that uniform samples could be obtained for tests. Analysis of the dried sludge showed that 40-gram portions contained 0.4105 gram equivalents of HCN and 0.196 gram equivalents of "free base." The term "free base" includes all of the hydroxides and carbonates in the sludge.

*Example 1.*—This example illustrates the first modification of the process described above.

Twenty grams of the dried sludge was mixed with 150 ccs. of water, and sufficient 5 N sulfuric acid, to give 10% more acid than that required to liberate the HCN and neutralize the free base present. Water was then added to bring the total volume of slurry to 285 ccs., giving a 2% solution of hydrogen cyanide containing the unchanged sulfide and other inert material in suspension. After agitating the slurry for ten minutes, it was allowed to settle overnight (16–18 hours). During this time, the solids had settled to give 200 ccs. of a clear solution which was acid (pH=2) but contained no soluble sulfides.

The clear solution was analyzed for HCN by boiling 20 cc. samples in a small distilling flask and absorbing the evolved HCN in caustic soda solution. The cyanide present in the absorber was determined by titration with standard silver nitrate. Total free HCN in the acid treated slurry was calculated from the amount found in the 20 cc. sample.

The results of three such experiments are given in the following table—

| Total cc. of slurry | Gm. equi. Zn(CN)$_2$ taken | Gm. equi. of "free base" present | Gm. equi. H$_2$SO$_4$ added | Gm. equi. HCN in 20 cc. sample | Gm. equi. HCN in total slurry | Mol % Zn(CN)$_2$ liberated as HCN |
|---|---|---|---|---|---|---|
| 285 | .205 | .098 | .333 | .0132 | .188 | 91.7 |
| 285 | .205 | .098 | .333 | .0134 | .191 | 93.1 |
| 280 | .205 | .098 | .333 | .0136 | .190 | 92.7 |

In the practical application, the solids remaining after treatment with acid are separated by any suitable means, and the freed HCN stripped from the clear solution. By this method, 92–93% of the zinc cyanide present in the original sludge can be recovered as hydrogen cyanide. The recovered hydrogen cyanide is sulfur-free.

*Example 2.*—This example illustrates the second modification of the process. It consists of a series of experiments in which the zinc cyanide sludge used in Example 1 was employed. In this series, forty grams of the dried sludge was mixed with 520–540 cc. of water and amounts of sulfuric acid between 10% less and 5% more than that required to react with the zinc cyanide and the free base present in the sludge.

The slurry was heated to about 60° C. to evolve most of the carbon dioxide. This slurry, while being agitated, was then charged through a packed stripping column to remove the freed hydrogen cyanide. This stripping column was fitted with a reflux condenser and was heated by injecting steam into the bottom. The stripped slurry drained continuously into a receiver, so that it could be treated to recover the zinc salts. The vapors evolved from the stripping column were absorbed in sodium hydroxide and analyzed for cyanide and sulfide. The results of these experiments are given in the following table—

| Gm. equi. of zinc cyanide taken | Gm. equi. of free base present | Gm. equi. of H$_2$SO$_4$ added | Percentage of required acid added | Gm. equi. HCN recovered | Mol % Zn(CN)$_2$ recovered as HCN | Sulfide content of recovered HCN |
|---|---|---|---|---|---|---|
| .4105 | .196 | .565 | 90 | .384 | 93.6 | Faint trace. |
| .4105 | .196 | .578 | 93 | .392 | 95.5 | Do. |
| .4105 | .196 | .586 | 95 | .398 | 97.0 | Do. |
| .4105 | .196 | .598 | 98 | .407 | 99.3 | Do. |
| .4105 | .196 | .606 | 100 | .409 | 99.6 | .018% H$_2$S |
| .4105 | .196 | .627 | 105 | .412 | 100.5 | .02–.03% H$_2$S |

It is thus obvious that if the amount of acid employed is somewhat less than the amount required to liberate all the HCN and neutralize all the base, practically a 100% yield of HCN may be obtained which contains only very slight traces of hydrogen sulphide. In this modification of the process it is not necessary to filter the acidified solution because even at the boiling temperature the concentration of acid in the solution is insufficient to attack the zinc sulphide and evolve hydrogen sulphide to any marked extent.

We claim:

1. In the process of recovering hydrocyanic acid from the final cooler water of coke oven gases by precipitating zinc cyanide, the improvement which comprises treating the zinc cyanide sludge which also contains zinc sulfide, calcium carbonate and calcium hydroxide, with an acid of sufficient strength and in amount sufficient to liberate in solution all of the avialable hydrocyanic acid but insufficient to establish in the solution a concentration of acid capable of liberating hydrogen sulfide, and recovering the hydrocyanic acid from the solution.

2. In the process of recovering hydrocyanic acid from the final cooler water of coke oven gases by precipitating zinc cyanide, the improvement which comprises treating the zinc cyanide sludge which also contains zinc sulfide, calcium carbonate and calcium hydroxide, with sulfuric acid in amount sufficient to liberate in solution all of the available hydrocyanic acid but insufficient to establish in the solution a concentration of acid capable of liberating hydrogen sulfide at a temperature of about 35° C., separating the solution from residual solids and recovering the hydrocyanic acid from the solution.

3. In the process of recovering hydrocyanic acid from the final cooler water of coke oven gases by precipitating zinc cyanide, the improvement which comprises treating the zinc cyanide sludge which also contains zinc sulfide, calcium carbonate and calcium hydroxide, with sulfuric acid in amount sufficient to liberate in solution all of the available hydrocyanic acid but insufficient to establish in the solution a concentration of acid capable of liberating hydrogen sulfide at a temperature of about 35° C., separating the solution from residual solids, heating the solution to about 60° C., to remove carbon dioxide and distilling the hydrocyanic acid from the remaining solution.

4. In the process of recovering hydrocyanic acid from the final cooler water of coke oven gases by precipitating zinc cyanide, the improvement which comprises treating the zinc cyanide sludge which also contains zinc sulfide, calcium carbonate and calcium hydroxide, with sulfuric acid in amount sufficient to liberate in solution all of the available hydrocyanic acid and at least some of the carbon dioxide but insufficient to establish in the solution a concentration of acid capable of liberating hydrogen sulfide and recovering the hydrocyanic acid from the solution.

5. In the process of recovering hydrocyanic acid from the final cooler water of coke oven gases by precipitating zinc cyanide, the improvement which comprises treating the zinc cyanide sludge which also contains zinc sulfide, calcium carbonate and calcium hydroxide, with sulfuric acid in amount sufficient to liberate in solution all of the available hydrocyanic acid and at least some of the carbon dioxide but insufficient to establish in the solution a concentration of acid capable of liberating hydrogen sulfide, heating the solution to about 60° C. to expel most of the carbon dioxide, and distilling the residual solution to recover the hydrocyanic acid.

ROBERT N. WASHBURNE.
LE ROY U. SPENCE.